United States Patent
Otsuka

(10) Patent No.: US 10,565,389 B2
(45) Date of Patent: Feb. 18, 2020

(54) FILE MANAGEMENT APPARATUS AND NON-TRANSITORY COMPUTER READABLE MEDIUM

(71) Applicant: FUJI XEROX CO., LTD., Tokyo (JP)

(72) Inventor: Toru Otsuka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 226 days.

(21) Appl. No.: 15/486,572

(22) Filed: Apr. 13, 2017

(65) Prior Publication Data

US 2018/0157856 A1 Jun. 7, 2018

(30) Foreign Application Priority Data

Dec. 5, 2016 (JP) .................................. 2016-235584

(51) Int. Cl.
*H04L 9/08* (2006.01)
*G06F 21/62* (2013.01)

(52) U.S. Cl.
CPC ........ *G06F 21/6209* (2013.01); *H04L 9/0891* (2013.01)

(58) Field of Classification Search
CPC .................................................... H04L 9/0891
See application file for complete search history.

(56) References Cited

U.S. PATENT DOCUMENTS

| | | | | |
|---|---|---|---|---|
| 9,852,377 | B1 * | 12/2017 | Kumar | G06N 5/04 |
| 2003/0154381 | A1 * | 8/2003 | Ouye | G06F 21/6209 |
| | | | | 713/182 |
| 2005/0021780 | A1 * | 1/2005 | Beyda | G06F 21/6218 |
| | | | | 709/229 |
| 2005/0187937 | A1 * | 8/2005 | Kawabe | G06F 21/6218 |
| 2005/0270579 | A1 * | 12/2005 | Hibi | H04N 1/00384 |
| | | | | 358/1.16 |
| 2007/0047006 | A1 * | 3/2007 | Sakai | G06F 3/1207 |
| | | | | 358/400 |
| 2007/0150475 | A1 * | 6/2007 | Hamada | G06F 16/93 |
| 2007/0288704 | A1 * | 12/2007 | Mizuno | H04N 1/00222 |
| | | | | 711/154 |
| 2008/0147667 | A1 * | 6/2008 | Hur | G06F 21/6218 |
| 2009/0100058 | A1 * | 4/2009 | Faitelson | G06F 21/6218 |
| 2009/0106674 | A1 * | 4/2009 | Bray | G06F 16/156 |
| | | | | 715/762 |
| 2009/0293135 | A1 * | 11/2009 | Nanaumi | G06F 21/6218 |
| | | | | 726/28 |
| 2010/0023491 | A1 * | 1/2010 | Huang | H04L 41/28 |
| | | | | 707/E17.014 |
| 2010/0106709 | A1 | 4/2010 | Imai et al. | |
| 2010/0161752 | A1 * | 6/2010 | Collet | H04L 67/104 |
| | | | | 709/216 |

(Continued)

FOREIGN PATENT DOCUMENTS

| | | |
|---|---|---|
| JP | 2009-301189 A | 12/2009 |
| JP | 2010-108111 A | 5/2010 |

*Primary Examiner* — Jason Chiang
(74) *Attorney, Agent, or Firm* — Oliff PLC

(57) ABSTRACT

A file management apparatus includes a receiving unit and a display controller. The receiving unit receives plural pieces of identification information of plural users who are allowed to access a file. The display controller controls display of a storage place that the users corresponding to the plural pieces of identification information received by the receiving unit are able to access, among storage places for which access right is set.

15 Claims, 14 Drawing Sheets

(56) References Cited

U.S. PATENT DOCUMENTS

| | | | |
|---|---|---|---|
| 2011/0029748 A1* | 2/2011 | Nakamura | G06F 11/1451 711/162 |
| 2011/0153671 A1* | 6/2011 | Taniguchi | G06F 21/604 707/786 |
| 2013/0135266 A1* | 5/2013 | Wen | G06F 3/0605 345/204 |
| 2013/0290464 A1* | 10/2013 | Barrall | G06F 16/211 709/213 |
| 2014/0258915 A1* | 9/2014 | Lakra | G06F 16/34 715/781 |
| 2015/0213284 A1* | 7/2015 | Birkel | G06Q 50/10 726/30 |
| 2016/0162371 A1* | 6/2016 | Prabhu | G06F 11/1461 707/654 |
| 2018/0039654 A1* | 2/2018 | Rodrigues | H04L 67/1095 |

\* cited by examiner

FIG. 4

| DRAWER NAME | SUBJECT | ACCESS RIGHT |
|---|---|---|
| DRAWER 1 | GROUP X | WRITE ACCESS |
| DRAWER 2 | USER 1<br>GROUP Y<br>USER 2 | WRITE ACCESS<br>READ ACCESS<br>READ ACCESS |
| DRAWER 3 | USER 1<br>GROUP Y | WRITE ACCESS<br>READ ACCESS |
| DRAWER 4 | USER 1<br>GROUP Y | WRITE ACCESS<br>WRITE ACCESS |

FIG. 5

| GROUP NAME | MEMBER |
|---|---|
| GROUP Y | USER 3<br>USER 4 |
| GROUP X | USER 5<br>USER 6 |

FIG. 8

```
UPLOAD
FILE NAME
81  [SPECIFICATION.txt]          [ SELECT ]
82  ☑ SEARCH FOR PLACE FOR WHICH FOLLOWING ACCESS RIGHT MAY BE SET
    [ DELETE ]              [ ADD USER ]  [ ADD GROUP ]

☐ USER/GROUP                    ACCESS RIGHT
83  ☐ GROUP Y                       READ ACCESS
    ☐ USER 1                        WRITE ACCESS

[ SEARCH ]   [ CANCEL ]
                                   84
```

FIG. 9

| DRAWER NAME | SUBJECT | ACCESS RIGHT |
|---|---|---|
| DRAWER 1 | USER 5<br>USER 6 | WRITE ACCESS<br>WRITE ACCESS |
| DRAWER 2 | USER 1<br>USER 3<br>USER 4<br>USER 2 | WRITE ACCESS<br>READ ACCESS<br>READ ACCESS<br>READ ACCESS |
| DRAWER 3 | USER 1<br>USER 3<br>USER 4 | WRITE ACCESS<br>READ ACCESS<br>READ ACCESS |
| DRAWER 4 | USER 1<br>USER 3<br>USER 4 | WRITE ACCESS<br>WRITE ACCESS<br>WRITE ACCESS |

FIG. 10

| SUBJECT | ACCESS RIGHT |
|---|---|
| USER 3 | READ ACCESS |
| USER 4 | READ ACCESS |
| USER 1 | WRITE ACCESS |

FIG. 11

| DRAWER NAME | SUBJECT | ACCESS RIGHT | DETERMINATION | PRIORITY |
|---|---|---|---|---|
| DRAWER 1 | USER 5<br>USER 6 | WRITE ACCESS<br>WRITE ACCESS | × | — |
| DRAWER 2 | USER 1<br>USER 3<br>USER 4<br>USER 2 | WRITE ACCESS<br>READ ACCESS<br>READ ACCESS<br>READ ACCESS | ○ | 3 |
| DRAWER 3 | USER 1<br>USER 3<br>USER 4 | WRITE ACCESS<br>READ ACCESS<br>READ ACCESS | ○ | 1 |
| DRAWER 4 | USER 1<br>USER 3<br>USER 4 | WRITE ACCESS<br>WRITE ACCESS<br>WRITE ACCESS | ○ | 2 |

FIG. 12

SPECIFY REGISTRATION PLACE

- DRAWER 3
- DRAWER 4
- DRAWER 2

OK    CANCEL

FIG. 13

| WARNING | | | |
|---|---|---|---|
| DOCUMENT IS REGISTERED IN THIS DRAWER BY FOLLOWING USER ON THE GROUND THAT CURRENT ACCESS RIGHT IS SET. DO YOU WISH TO CHANGE ACCESS RIGHT? | | | |
| REGISTRAR NAME | DOCUMENT NAME | ACCESS RIGHT HOLDER | REGISTERED DATE AND TIME |
| USER 0 | SPECIFICATION.txt | USER 3<br>USER 4<br>USER 1 | 2016/12/20 |

OK (1302)   CANCEL (1301)

FIG. 16

| FOLDER NAME | OPERATION NAME | OPERATOR NAME | ... | DETERMINATION |
|---|---|---|---|---|
| FOLDER A | DOCUMENT REGISTRATION | USER 3 | | ○ |
| FOLDER B | DOCUMENT DOWNLOAD | USER 4 | | ○ |
| FOLDER C | MONITORING OF DOCUMENT REGISTRATION | USER 1 | | ○ |
| FOLDER A | DELETION | USER 4 | | × |
| FOLDER B | DOCUMENT DISCLOSURE | USER 6 | | × |
| FOLDER D | VERSION ADDITION | USER 5 | | × |
| FOLDER B | CHILD OBJECT LIST | USER 4 | | ○ |
| FOLDER C | DELETION | USER 6 | | × |
| ... | | | | |

FIG. 17

| |
|---|
| DOCUMENT REGISTRATION |
| DOCUMENT DOWNLOAD |
| VERSION ADDITION |
| MONITORING OF DOCUMENT REGISTRATION |
| CHILD OBJECT LIST |

FIG. 18

| FOLDER NAME | TOTAL NUMBER OF OPERATIONS | NUMBER OF OPERATIONS BY SUBJECT OF queryAcl | RATIO |
|---|---|---|---|
| FOLDER A | 100 | 30 (USER 3: 15, USER 4: 10, USER 1: 5) | 0.3 |
| FOLDER B | 50 | 10 | 0.2 |
| FOLDER C | 150 | 20 | 0.13 |
| FOLDER D | 100 | 10 | 0.1 |

FIG. 19

| FOLDER NAME | DOCUMENT NAME | SIMILARITY WITH DOCUMENT TO BE REGISTERED |
|---|---|---|
| FOLDER A | DOCUMENT A | 0.5 |
| FOLDER A | DOCUMENT B | 0.3 |
| FOLDER B | DOCUMENT C | 0.6 |
| FOLDER B | DOCUMENT D | 0.1 |
| FOLDER C | DOCUMENT E | 0.8 |
| FOLDER C | DOCUMENT F | 0.1 |

| FOLDER NAME | SIMILARITY WITH DOCUMENT TO BE REGISTERED |
|---|---|
| FOLDER A | 0.4 |
| FOLDER B | 0.35 |
| FOLDER C | 0.45 |

FILE MANAGEMENT APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-235584 filed Dec. 5, 2016.

BACKGROUND (i) Technical Field

The present invention relates to a file management apparatus and a non-transitory computer readable medium.

(ii) Related Art

Document management apparatuses may provide an access right list (hereinafter, referred to as an access control list "ACL") for each user or group to a document. In general, documents are categorized and stored in memory regions such as folders formed based on a hierarchical structure. In recent years, document management apparatuses which forcibly set the same ACL for documents in and below a certain layer have been appearing to increase security.

With the document management apparatuses of this type, only a specific user such as an administrator is able to set ACLs, and general users may not individually set ACLs for documents. Therefore, regarding a document to be registered by a general user, an ACL set in advance for a folder or the like as a storage place for the document is applied to the document. Thus, in order that a general user sets a desired ACL for a document to be registered, the user needs to find a storage place for which the desired ACL is set and to register the document in the found storage place.

SUMMARY

According to an aspect of the invention, there is provided a file management apparatus including a receiving unit and a display controller. The receiving unit receives plural pieces of identification information of plural users who are allowed to access a file. The display controller controls display of a storage place that the users corresponding to the plural pieces of identification information received by the receiving unit are able to access, among storage places for which access right is set.

BRIEF DESCRIPTION OF THE DRAWINGS

Exemplary embodiments of the present invention will be described in detail based on the following figures, wherein:

FIG. 4 is a diagram illustrating a data configuration example of a storage place ACL set in a storage place ACL memory in the first exemplary embodiment;

FIG. 5 is a diagram illustrating a data configuration example of group information set in a group information memory in the first exemplary embodiment;

FIG. 8 is a diagram illustrating an example of an upload screen displayed when a document is registered in the document management apparatus in the first exemplary embodiment;

FIG. 9 is a diagram illustrating an example of setting details of ACLs for drawers obtained by expanding a group included in a storage place ACL set in the first exemplary embodiment into users;

FIG. 10 is a diagram illustrating an example of setting details of a query ACL obtained by expanding a group included in an ACL for a document set by a registrar in the first exemplary embodiment into users;

FIG. 11 is a diagram illustrating an example of a list of drawers as candidates for registration destinations for a document in the document registration process in the first exemplary embodiment;

FIG. 12 is a diagram illustrating a display example of a list screen of drawers as candidates for a registration destination for a document in the first exemplary embodiment;

FIG. 13 is a diagram illustrating a display example of a warning screen in the first exemplary embodiment;

FIG. 16 is a diagram illustrating part of operation history information extracted from an operation history information memory in the second exemplary embodiment;

FIG. 17 is a diagram illustrating an example of a related operation list stored in a related operation information memory in the second exemplary embodiment;

FIG. 18 is a diagram illustrating an example of a data configuration of operation ratio information stored in an operation ratio information memory in the second exemplary embodiment;

FIG. 19 is a diagram illustrating the similarity between a document to be registered and a document stored in a folder as a candidate for a registration destination in the second exemplary embodiment;

DETAILED DESCRIPTION

Hereinafter, exemplary embodiments of the present invention will be described with reference to drawings.

First Exemplary Embodiment

Figure 1:
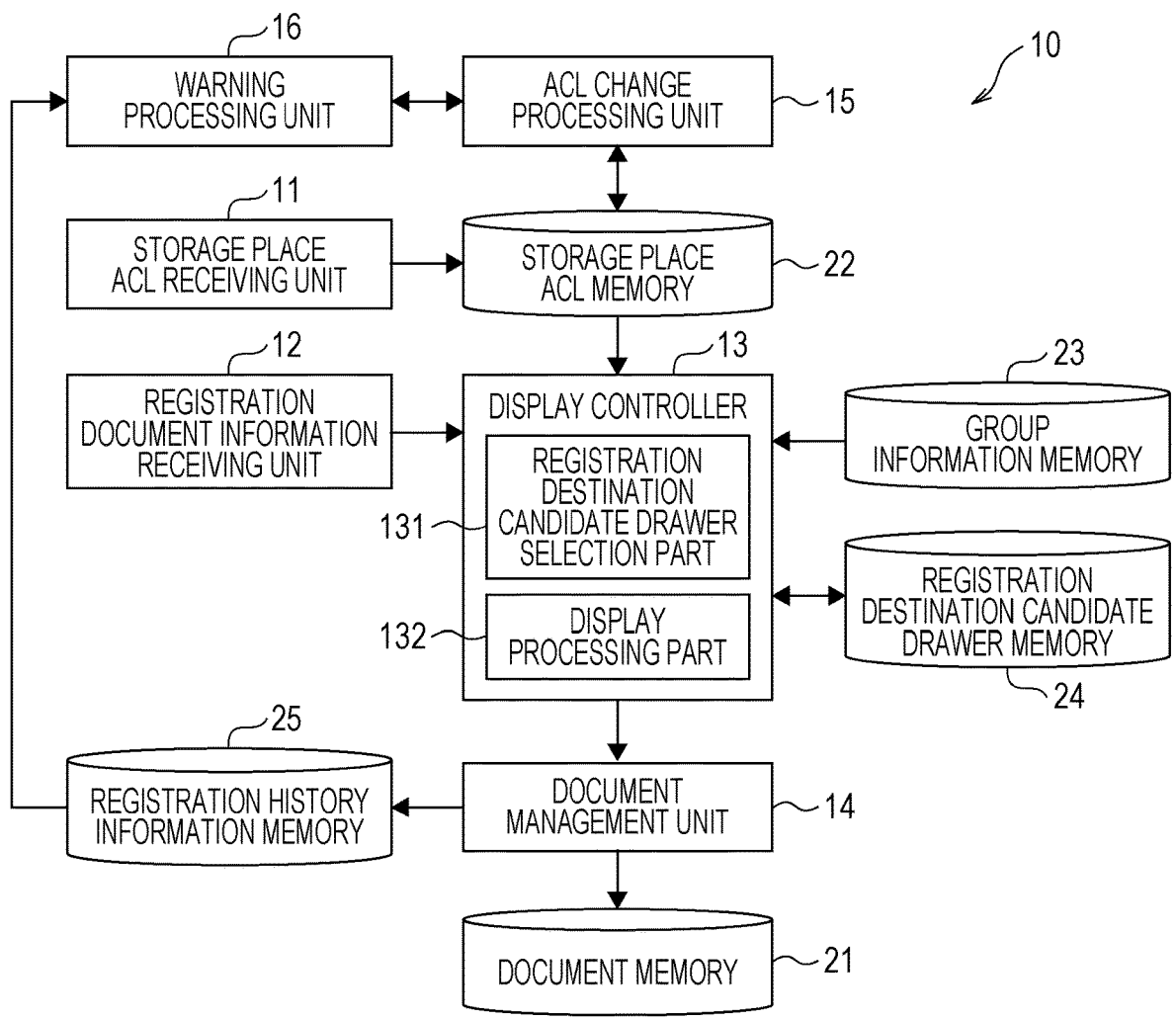
FIG. 1 is a block configuration diagram of a document management apparatus according to a first exemplary embodiment.

FIG. 1 is a block configuration diagram of a document management apparatus according to a first exemplary embodiment. A document management apparatus 10 corresponds to a file management apparatus according to an exemplary embodiment of the present invention, and manages electronic data of a document, which is a form of a file (hereinafter, simply referred to as a "document"). The document management apparatus 10 is installed, for example, at a data center or the like on the Internet, and holds and manages documents transmitted from external devices such as a multifunction device, a personal computer (PC), and a mobile terminal via the Internet.

Figure 2:
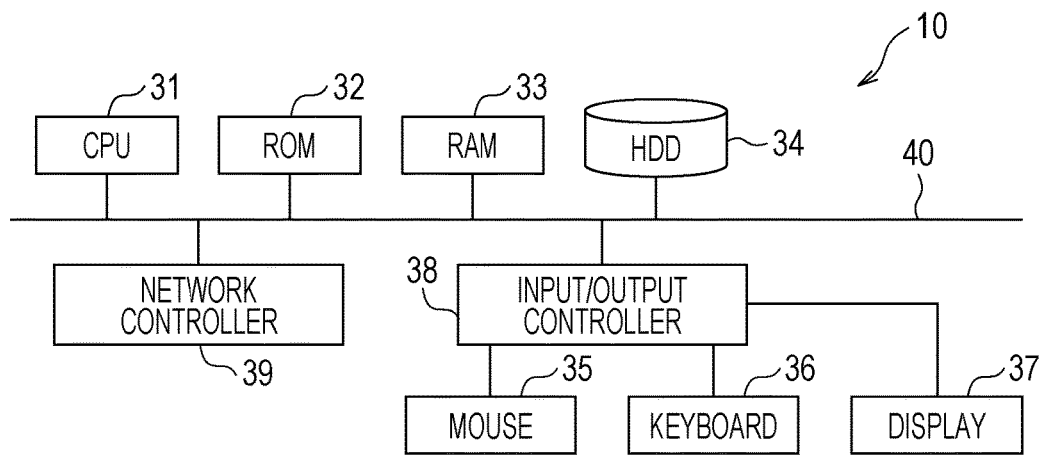
FIG. 2 is a hardware configuration diagram of a server computer which forms the document management apparatus according to the first exemplary embodiment.

FIG. 2 is a hardware configuration diagram of a server computer which forms the document management apparatus 10 according to the first exemplary embodiment. In the first exemplary embodiment, a server computer which forms the document management apparatus 10 may be implemented with an existing general-purpose hardware configuration. That is, as illustrated in FIG. 2, the document management apparatus 10 includes a central processing unit (CPU) 31, a read only memory (ROM) 32, a random access memory (RAM) 33, a hard disk drive (HDD) 34, an input/output controller 38 which allows connection among a mouse 35 and a keyboard 36 provided as an input unit and a display 37 provided as a display, and a network controller 39 provided as a communication unit, all of which are connected via an internal bus 40.

Referring back to FIG. 1, the document management apparatus 10 according to the first exemplary embodiment includes a storage place ACL receiving unit 11, a registration document information receiving unit 12, a display controller 13, a document management unit 14, an ACL change processing unit 15, a warning processing unit 16, a document memory 21, a storage place ACL memory 22, a group information memory 23, a registration destination candidate drawer memory 24, and a registration history information memory 25. Any component which is not used in explanation for the first exemplary embodiment is omitted from FIG. 1. The storage place ACL receiving unit 11 receives an access right list (ACL) to be set for a storage place for a document specified by an administrator of a document who is able to operate the document management apparatus 10, and registers the received ACL in the storage place ACL memory 22. The registration document information receiving unit 12 functions as a receiving unit that receives registration document information specified by a registrar who requires the document management apparatus 10 to register a document. The registration document information includes identification information of plural users who are allowed to access the document and access right which is to be granted to the users. In the first exemplary embodiment, a user name is used as identification information of a user. However, other types of identification information such as a user ID may be used.

The display controller 13 functions as a display controller that controls display of a storage place that users corresponding to plural pieces of identification information received by the registration document information receiving unit 12 are able to access, among storage places for which ACLs are set. The display controller 13 includes a registration destination candidate drawer selection part 131 and a display processing part 132. As described later in detail, in the first exemplary embodiment, multiple drawers are provided as a form of storage places for documents. The registration destination candidate drawer selection part 131 selects a drawer as a candidate for a registration destination for a document from among multiple drawers. The display processing part 132 displays a drawer as a candidate for a registration destination for a document.

The document management unit 14 manages documents stored in the document memory 21. In the first exemplary embodiment, specifically, the document management unit 14 performs registration of a document to be registered in the document memory 21, registration of information regarding document registration in the registration history information memory 25, and the like. As described above, registering a document in a drawer specified by a registrar is performed by the document management unit 14. However, in the explanation below, for the sake of convenience, description may be provided in which a registrar registers a document. The document management unit 14 also functions as a storage place creating unit that creates, in the case where no storage place that a user corresponding to identification information received by the registration document information receiving unit 12 is able to access exists, a storage place for the document by creating a new storage place or changing setting of access right for an existing storage place. Furthermore, the document management unit 14 functions as a file deleting unit that deletes, in the case where a user who receives a notification by the warning processing unit 16 indicating that a storage place is to be deleted rejects the deletion of the storage place, documents other than a document registered in the storage place by the user who rejects the deletion. Furthermore, the document management unit 14 functions as a moving unit that creates, in the case where a user who receives a notification by the warning processing unit 16 indicating that setting of access right for a storage place is to be changed rejects the change, a new storage place which takes over the setting of the access right for the storage place and moves a file registered in the storage place by the user who rejects the change to the created new storage place.

The ACL change processing unit 15 performs processing for changing setting of an ACL set for a storage place. Changing access right is performed by an administrator. In the case where an ACL for a drawer in which a document is registered in accordance with a document registration process characteristic to the first exemplary embodiment is to be changed, the warning processing unit 16 issues a warning to the administrator. Furthermore, the warning processing unit 16 functions as a notifying unit that notifies, in the case where a storage place is to be deleted or setting of access right for a storage place is to be changed, a user by which a document is registered in the storage place of the deletion of the storage place or the change of the setting of the access right for the storage place.

Figure 3:
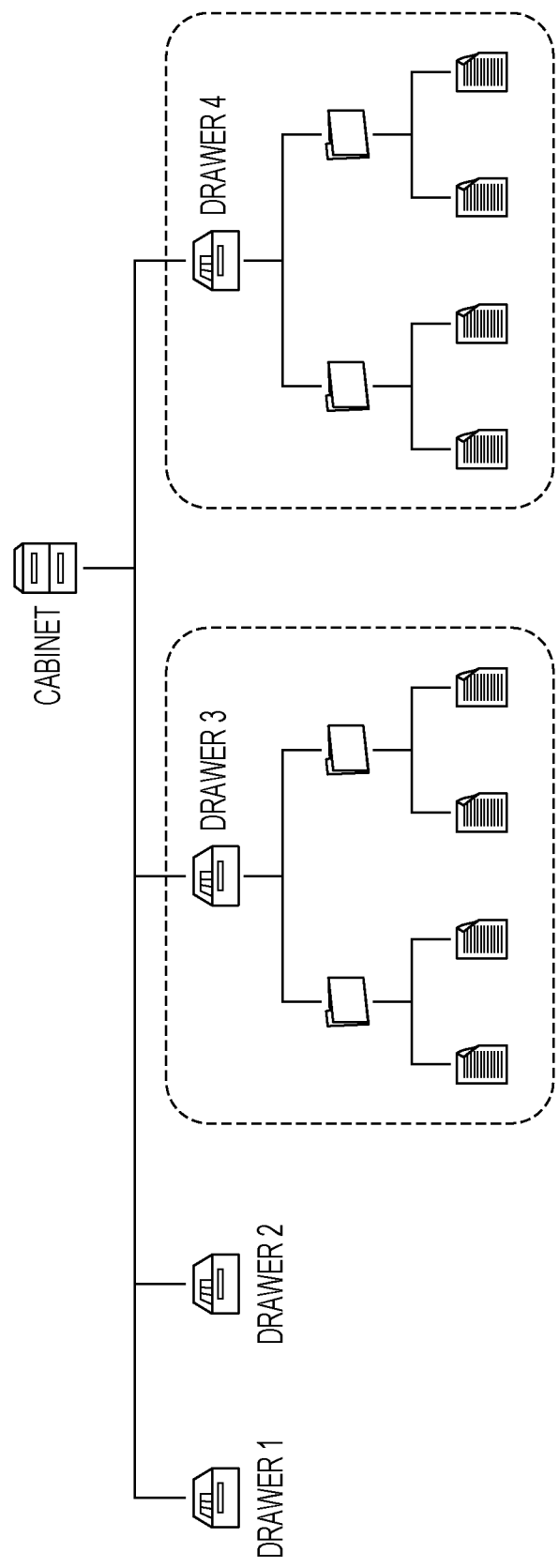
FIG. 3 is a conceptual diagram illustrating the relationship of storage places set in a document memory in the first exemplary embodiment.

FIG. 3 is a conceptual diagram illustrating the relationship of storage places set in the document memory 21 in the first exemplary embodiment. In the first exemplary embodiment, a storage place in the uppermost layer is called a "cabinet", and a storage place immediately below the cabinet is called a "drawer". In addition, a "folder" is formed as a storage place in a layer lower than the drawer. Furthermore, another folder may be formed in a layer lower than the folder. A document may be stored in a drawer or a folder. When an administrator sets an ACL for a drawer, the same ACL is set for folders and documents in layers lower than the drawer. That is, in FIG. 3, the same ACL is set for storage places and documents surrounded by a broken line.

FIG. 4 is a diagram illustrating a data configuration example of a storage place ACL set in the storage place ACL memory 22 in the first exemplary embodiment. A storage place ACL is set such that a drawer name for identifying each drawer is associated with a subject indicating a user or a group which may access the drawer and access right set for the subject.

FIG. 5 is a diagram illustrating a data configuration example of group information set in the group information memory 23 in the first exemplary embodiment. Group information is set in advance by an administrator. Group information is set such that a group name for identifying each group is associated with a user name as identification information of one or plural users belonging to the group.

Explanation for the registration destination candidate drawer memory 24 and the registration history information memory 25 will be provided later along with explanation for processes.

The storage place ACL receiving unit 11, the registration document information receiving unit 12, the display controller 13, the document management unit 14, the ACL change processing unit 15, and the warning processing unit 16 of the document management apparatus 10 are implemented by cooperative operation of a computer forming the document management apparatus 10 and a program running on the CPU 31 mounted on the computer. Furthermore, the document memory 21, the storage place ACL memory 22, the group information memory 23, the registration destination candidate drawer memory 24, and the registration history information memory 25 are implemented by the HDD 34 mounted on the document management apparatus 10. Alternatively, the RAM 33 or an external memory may be used via a network.

Furthermore, a program used in the first exemplary embodiment may not only be provided by a communication unit but also be stored in a computer-readable recording medium such as a compact disc-read only memory (CD-ROM) or a universal serial bus (USB) and supplied. Various processes are implemented when a program supplied from the communication unit or the recording medium is installed into a computer and is sequentially executed by a CPU of the computer.

Next, an operation in the first exemplary embodiment will be described.

Figure 6:
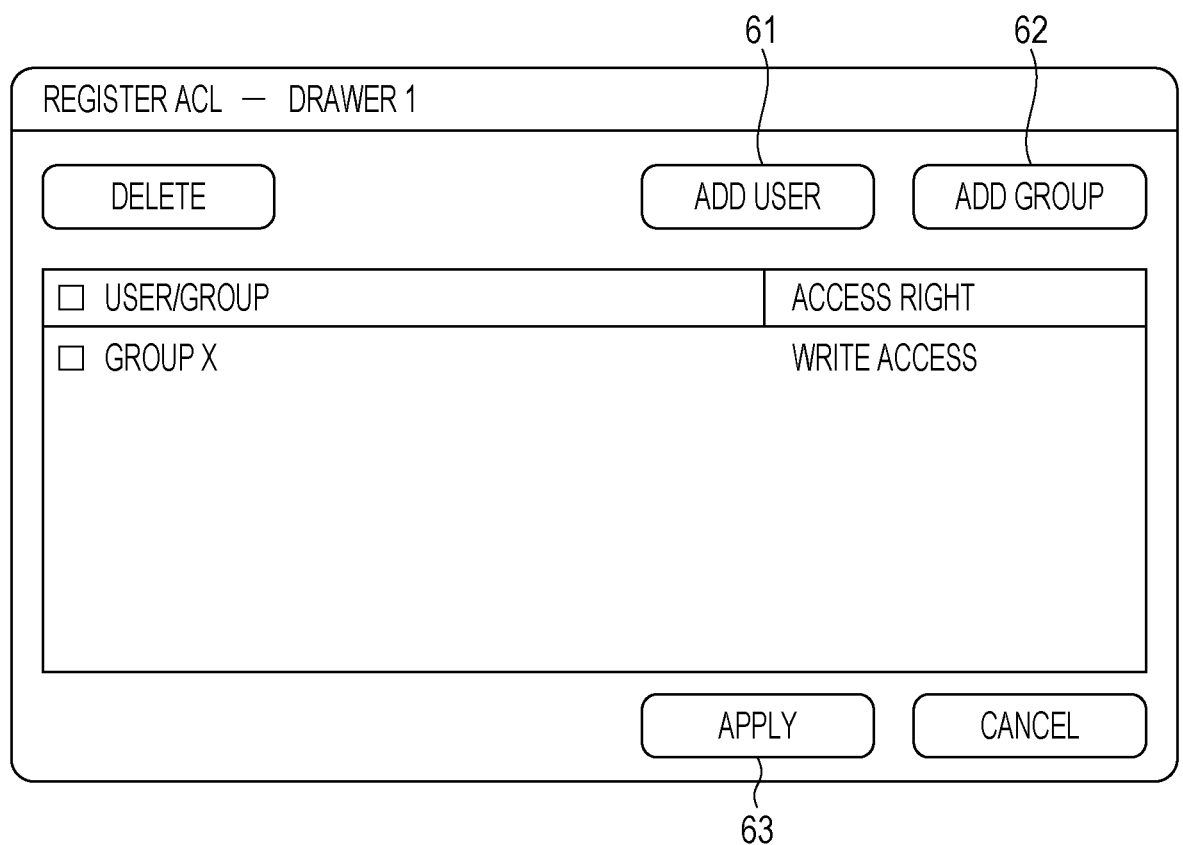
FIG. 6 is a diagram illustrating an example of a storage place ACL registration screen in the first exemplary embodiment.

As described above, an ACL needs to be set in advance for each drawer provided in the document memory 21. For this, when an administrator performs a specific operation for performing setting registration of a storage place ACL, the storage place ACL receiving unit 11 displays an ACL registration screen illustrated in FIG. 6 on the display 37. FIG. 6 illustrates an example of display provided when a setting operation for drawer 1 is performed. An administrator sets, on the registration screen, a user or a group who is granted access to the drawer 1 and access right granted to the user or the group. For example, when an "add user" button 61 is pressed, a list of users who may use the document management apparatus 10 is displayed. Thus, an administrator selects a user for whom access right is to be set from the list. In a similar manner, when an "add group" button 62 is pressed, a list of groups which may use the document management apparatus 10 is displayed. Thus, an administrator selects a group for which access right is to be set from the list. Then, access right is set for the user or group displayed on the registration screen. The administrator performs the above setting operation for each drawer. Upon requesting for registration of an ACL when the administrator presses an "apply" button 63, the storage place ACL receiving unit 11 receives the set contents, and registers the set contents in the storage place ACL memory 22. Accordingly, a storage place ACL illustrated in FIG. 4 is set.

Figure 7:
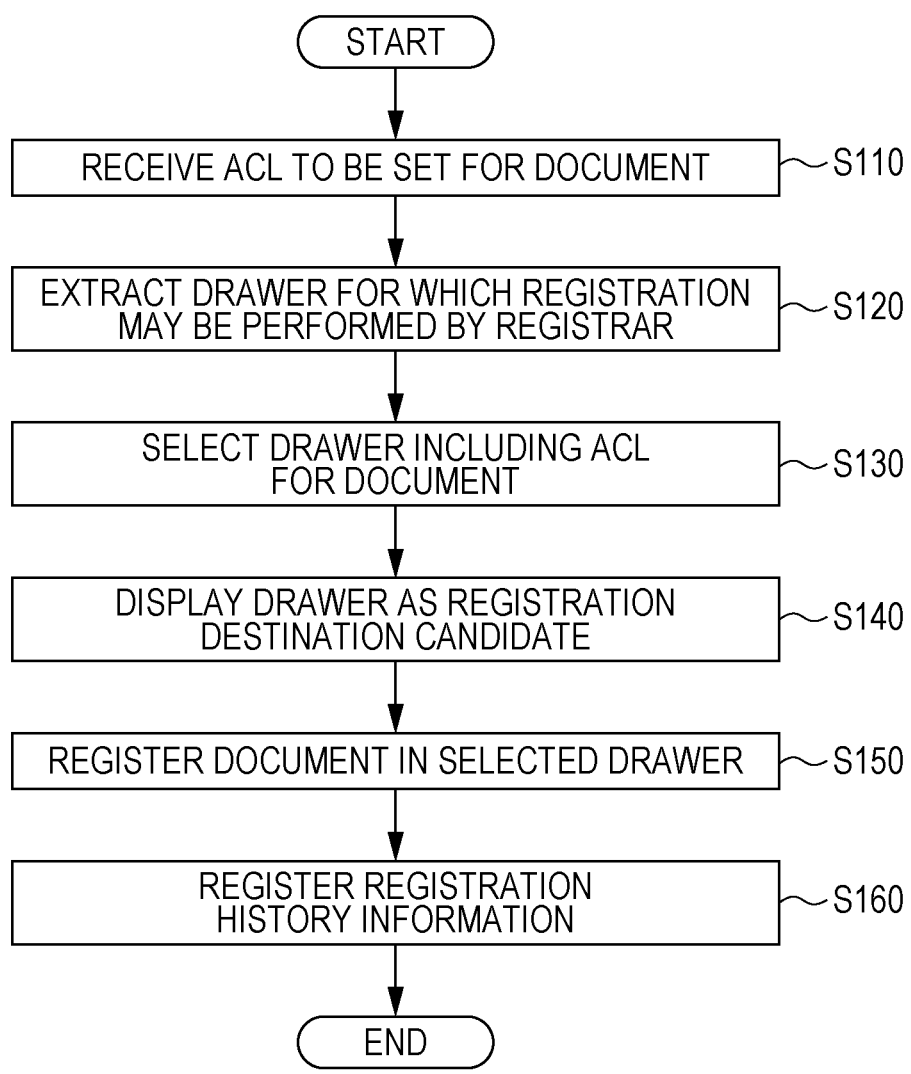
FIG. 7 is a flowchart illustrating a document registration process according to the first exemplary embodiment.

Next, a document registration process according to the first exemplary embodiment will be described with reference to a flowchart illustrated in FIG. 7. In the first exemplary embodiment, a case where a drawer is set as a registration destination for a document will be descried by way of example.

A user (registrar) who desires to register a document to the document management apparatus 10 accesses the document management apparatus 10 from a user terminal, which is not illustrated in figures, and issues a request for registration of a document (upload request) by performing a specific operation.

The registration document information receiving unit 12 of the document management apparatus 10 transmits an upload screen for document registration illustrated in FIG. 8 in accordance with the document upload request from the registrar, and causes the upload screen to be displayed on the user terminal.

The registrar sets, on the upload screen, a file name of a document to be registered in a file name input region 81, ticks a checkbox 82 to search for a storage place for the document, and then specifies an ACL to be set for the document in an ACL setting region 83. The ACL set in the ACL setting region 83 is an ACL that the registrar desires to set for the document, and is also an ACL to be used to search for a drawer, as described later. Setting of an ACL is similar to setting of a storage place ACL, and therefore, explanation for setting of an ACL will be omitted. When the registrar sets an ACL and presses a "search" button 84, the registration document information receiving unit 12 receives a user name of the registrar and registration document information including the setting details of the ACL (step 110).

Next, upon receiving the registration document information transmitted from the user terminal, the display controller 13 presents to the registrar a drawer as a candidate for a registration destination for the document, based on the registration document information. For this, the registration destination candidate drawer selection part 131 extracts, based on a user name of the registrar included in registration document information, from the document memory 21 a drawer for which the registrar has a registration authority (step 120). At this time, the registration destination candidate drawer selection part 131 also acquires an ACL set for the drawer. Furthermore, in the case where a group is set for the acquired ACL, the registration destination candidate drawer selection part 131 expands the group into users by referring to group information.

For example, let a registrar be able to register a document in any of the drawers 1 to 4. The drawers 1 to 4 are extracted as candidates for registration destinations. Then, ACLs for the drawers 1 to 4 illustrated in FIG. 4 are acquired from the storage place ACL, and groups are expanded into users by referring to the group information illustrated in FIG. 5. Accordingly, registration destination candidate information illustrated in FIG. 9 is acquired.

Next, in order that the registrar sets an ACL set using the upload screen illustrated in FIG. 8 for a document to be registered, the registration destination candidate drawer selection part 131 compares the ACL with an ACL for each drawer included in the registration destination information.

First, in the setting example illustrated in FIG. 8, a group is specified. Therefore, an ACL for which the group is expanded into users (hereinafter, also referred to as a "query ACL") is acquired. A setting example of the query ACL is illustrated in FIG. 10. The registration destination candidate drawer selection part 131 compares the query ACL illustrated in FIG. 10 with the registration destination candidate information illustrated in FIG. 9, and searches for a drawer which includes users included in the query ACL. In the setting example illustrated in FIG. 9, the drawer 1 does not include all the users illustrated in FIG. 10. Therefore, the drawer 1 is excluded from a registration destination candidate. The other drawers 2 to 4 include all the users (users 1, 3, and 4) included in the query ACL, and therefore, the registration destination candidate drawer selection part 131 selects the drawers 2 to 4 as registration destination candidates (step 130). To indicate that the drawers 2 to 4 are suitable as a registration destination, a circle mark is set as a determination item. In contrast, to indicate that the drawer 1 is not suitable as a registration destination, an X mark is set as a determination item.

Next, the display controller 13 presents a drawer as a registration destination candidate to the registrar. In the first exemplary embodiment, the arrangement order of registration destination candidates is controlled to be displayed as a list in accordance with a predetermined prioritization condition. For this, the display processing part 132 compares the query ACL illustrated in FIG. 10 with access right of each user included in the registration destination candidate information illustrated in FIG. 9.

For example, the ACL for the drawer 2 matches the access right of each user set in the query ACL. However, the ACL for the drawer 2 includes the user 2, who is not included in the query ACL. The ACL for the drawer 3 matches the access right of each user set in the query ACL. That is, the ACL for the drawer 3 totally matches the access right of each user set in the query ACL, which represents that the ACL for the drawer 3 is the same as the access right of each user set in the query ACL. Write access includes read access, and therefore, the ACL for the drawer 4 includes the access right of each user set in the query ACL. However, write access is granted to the users 3 and 4, which is not requested by the registrar.

In the first exemplary embodiment, drawers are arranged in accordance with a prioritization condition that a list is displayed in descending order of the matching degree between the query ACL and the ACL for a drawer. In the first exemplary embodiment, indices of the number of users and access right are used as criteria for the matching degree. First, in the ACL for each of the drawers 2 to 4 selected by the processing illustrated in step 130 includes all the users and access right of the query ACL. Based on this assumption, in view of the number of users, each of the drawers 3 and 4 matches the number of users of the query ACL. In contrast, the drawer 2 includes one more user. In the first exemplary embodiment, control is performed such that a drawer with a less number of users is displayed preferentially. Therefore, the priority level of the drawers 3 and 4 is higher than that of the drawer 2. Furthermore, in view of access right, each of the drawers 2 and 3 matches the access right of the query ACL. In contrast, regarding the drawer 4, more access right than that requested by the registrar is granted to the users 3 and 4. In other words, a broader access right is granted. In the first exemplary embodiment, control is performed such that a drawer with a narrower access right (high matching degree) is displayed preferentially. Therefore, the priority level of the drawers 2 and 3 is higher than that of the drawer 4.

Consequently, first, the ACL for the drawer 3 completely matches the query ACL in terms of the number of users and access right, and is therefore provided with highest priority. Then, regarding prioritization of the drawers 2 and 4, in the first exemplary embodiment, control is performed such that a difference in access right is more emphasized. This is because it may be considered that a registrar desires not granting access right to a document to a non-requested user compared to granting more access right than that requested to a user to be granted access right. As a result of determination based on such a prioritization condition, in the first exemplary embodiment, the priority level of the drawer 4 is set higher than that of the drawer 2. In FIG. 11, the priority levels determined in the above processing are set as a priority level item.

As described above, after determining a drawer as a registration destination for the document and a display order, the display processing part 132 transmits the list of drawers to the user terminal so that the list is displayed on the user terminal (step 140). A display example of a drawer list screen displayed on the user terminal is illustrated in FIG. 12. The drawer list screen is displayed after the registrar presses the "search" button 84 on the upload screen illustrated in FIG. 8. The registrar selects a drawer to be used as a registration destination for the document from the drawers displayed on the list screen.

In the first exemplary embodiment, a drawer is used as a registration destination for a document, and therefore, only drawers are displayed in a list. However, folders in a layer lower than a drawer may also be displayed. Furthermore, a folder may be selected as a registration destination for a document. There is no problem in terms of access right when a folder is selected because the same ACL as a drawer in an upper level is set for each folder.

When a drawer is selected by the registrar, the document management unit 14 acquires the document to be registered, which is transmitted from the user terminal, and registers the document in the drawer selected on the list screen (step 150). Acquisition of a document may be performed not only at this time but also at any time after the "search" button 84 is pressed in step 110.

Next, the document management unit 14 generates registration history information including identification information of the registered document (document name), the registration destination drawer, the registrar, the registered date and time, the registration document information (or query ACL), and registers the registration history information in the registration history information memory 25 (step 160).

In the first exemplary embodiment, with the above processing, a drawer in which a document may be registered with an ACL desired by the registrar may be presented to the registrar. Only by selection from drawers presented as registration destination candidates, the registrar may register a document with a desired ACL without searching for a drawer for which the desired ACL is set.

In the case where no drawer in which a document may be registered with an ACL specified by a registrar exists, the document management unit 14 may create a new drawer with an ACL matching a query ACL or an ACL including the query ACL and register the document in the created new drawer. In this case, a notification indicating that a new appropriate ACL is created may be transmitted to the registrar. Alternatively, the document management unit 14 may create a storage place for a document to be registered by changing setting of the ACL for an existing drawer. In this case, the display controller 13 performs control such that a drawer with a less number of changes in setting for an ACL is displayed preferentially. Then, the registrar selects the storage place for the document.

An administrator may change an ACL for a drawer for some reasons, as described above. Alternatively, an administrator may delete a drawer. Once an ACL for a drawer in which a document is registered in accordance with the above document registration process is changed, the ACL for the document is also changed. Thus, in the first exemplary embodiment, such a case may be handled.

The ACL change processing unit 15 displays an ACL setting change screen on the display 37 in accordance with an operation instruction from an administrator. The administrator performs a setting change process for an ACL for a drawer on the ACL setting change screen. The warning processing unit 16 monitors an operation of the ACL change processing unit 15. When detecting that an ACL for a drawer in which a document is registered in the document registration process is being changed, the warning processing unit 16 displays a warning screen on the display 37. A drawer in which a document is registered in accordance with the above document registration process may be identified with reference to the registration history information memory 25.

FIG. 13 is a diagram illustrating a display example of a warning screen in the first exemplary embodiment. On the warning screen, a message for informing an administrator that a document is registered in accordance with the document registration process in a drawer for which an ACL is being changed and corresponding registration history information are displayed. The administrator refers to the warning screen and decides whether or not to change setting of the ACL.

In order not to change setting of the ACL, the administrator presses a "cancel" button 1301 to end the setting change process. In order to select changing the setting of the ACL, the administrator presses an "OK" button 1302 so that the setting change process proceeds.

If a registrar is not informed of setting change of the ACL, inconvenience may occur to the registrar and a user of the document. Therefore, the warning processing unit 16 transmits to the registrar a notification indicating that the ACL for the drawer in which the document is registered is being changed.

However, in the case where the registrar makes a response to the notification, the response indicating rejection of the change, the document management unit 14 creates a new drawer which takes over setting of the access right of the drawer as a ACL change target, in accordance with an instruction from the warning processing unit 16, and moves the document registered by the registrar in the drawer as the ACL change target to the created new drawer. Accordingly, the ACL for the document is avoided from being changed.

Furthermore, an administrator may delete a drawer for some reasons. If a drawer in which a document is registered in accordance with the above document registration process is deleted, the document is also deleted. Thus, in the first exemplary embodiment, such a case may be handled.

That is, the warning processing unit 16 monitors an operation of the document management unit 14, and when detecting that an administrator tries to delete a drawer, the warning processing unit 16 notifies a registrar that the drawer in which the document is registered is being deleted.

In the case where the registrar makes a response to the notification, the response indicating rejection of the deletion, the document management unit 14 deletes files other than the document by the registrar who rejects the deletion from among files stored in the drawer, instead of deleting the drawer as a deletion target.

In the first exemplary embodiment, with this processing, the ACL for the registered document is not changed. If the administrator accepts setting change of the ACL or deletion of the drawer, the ACL for the corresponding document is changed or the document is deleted. In this case, the registrar may be informed of change of the ACL for the document or deletion of the document.

As described above, in the first exemplary embodiment, the ACL change processing unit 15 is provided so that setting of an ACL for a drawer may be changed. Registration of a new ACL performed by the storage place ACL receiving unit 11 and change of setting for an ACL performed by the ACL change processing unit 15 are performed for the ACL for the same drawer. Therefore, these functions may be implemented by the same component.

Furthermore, in the first exemplary embodiment, explanation is provided in which an administrator performs setting and the like for an ACL through an input unit and a display included in the document management apparatus 10. However, an administrator may perform various settings using an administrator terminal, which may be a PC or the like, provided separately from the document management apparatus 10, via the Internet.

Second Exemplary Embodiment

In the first exemplary embodiment, a drawer is selected as a registration destination for a document. However, in terms of document management, documents may be managed by being categorized into folders provided in a layer lower than a drawer. As described above, the same ACL is set for a drawer and a folder in a layer below the drawer. Therefore, there is no problem in terms of access right, irrespective of which place a document is registered in.

Thus, in a second exemplary embodiment, a folder appropriate for a registrar as a registration destination for a document may be searched for, and the found appropriate folder may presented to the registrar. More specifically, the second exemplary embodiment is characterized in that a folder in which a document similar to a document to be registered is registered, among folders with high frequency of use by a user as a holder of access right to a document ("subject" in the query ACL illustrated in FIG. 10), may be presented as a registration destination candidate for the document.

Figure 14:
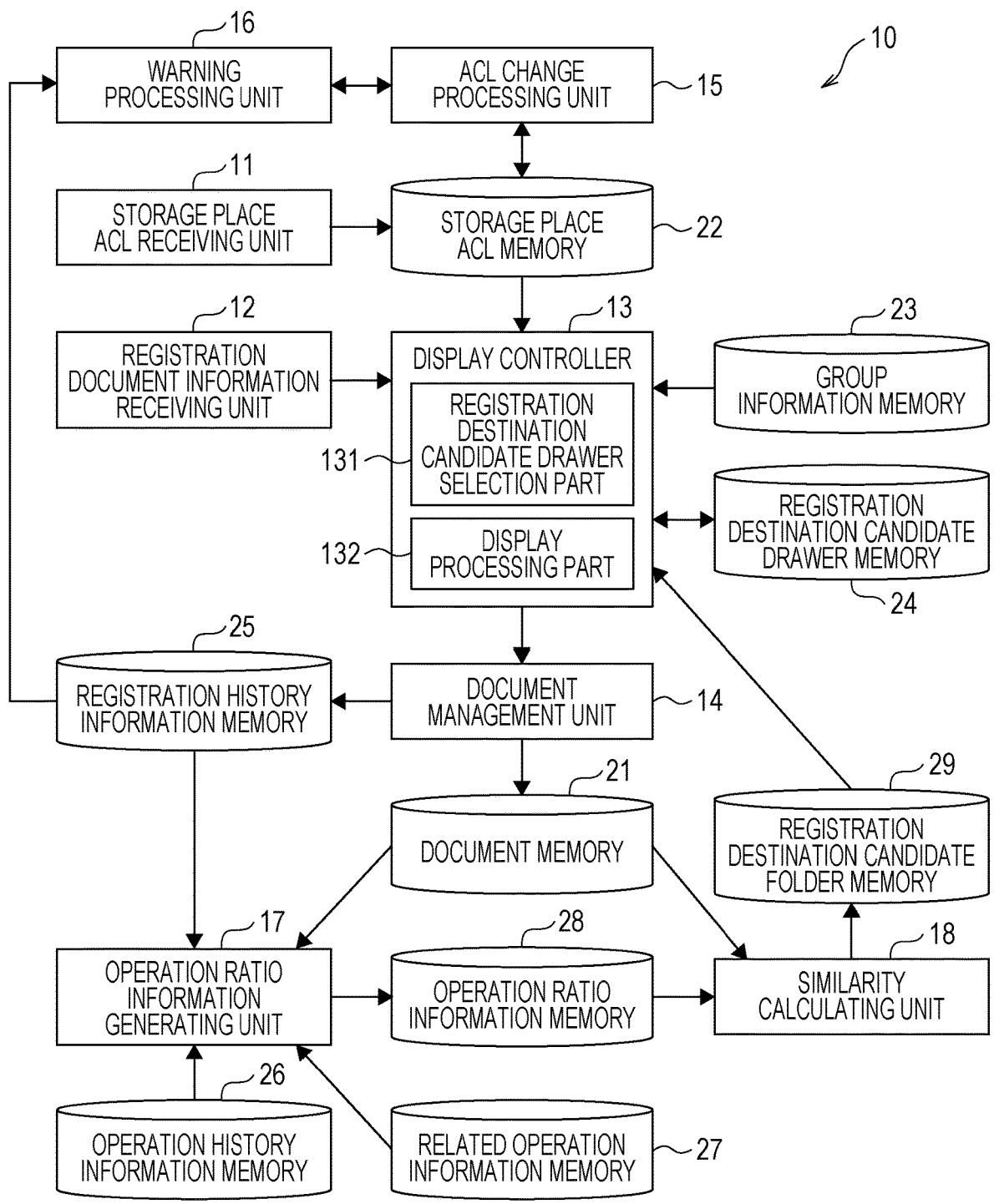
FIG. 14 is a block configuration diagram of a document management apparatus according to a second exemplary embodiment.

FIG. 14 is a block configuration diagram of a document management apparatus according to the second exemplary embodiment. The same components as those in the first exemplary embodiment are referred to with the same signs, and explanation for those same components will be omitted. The document management apparatus 10 according to the second exemplary embodiment includes, in addition to the components of the document management apparatus 10 according to the first exemplary embodiment, an operation ratio information generating unit 17, a similarity calculating unit 18, an operation history information memory 26, a related operation information memory 27, an operation ratio information memory 28, and a registration destination candidate folder memory 29. In the operation history information memory 26, history information of operations performed on documents stored in the document memory 21 is stored. The operation ratio information generating unit 17 generates operation ratio information by extracting operation history information regarding operations on a document stored in a folder in a layer below a selected drawer from among the operation history information stored in the operation history information memory 26 and calculating a ratio of operations performed by a subject ("subject" in a query ACL) and corresponding to related operations, which will be described later, to the extracted operation history information, and registers the generated operation ratio information in the operation ratio information memory 28. As described above, a document registration process in the second exemplary embodiment is the same as the document registration process in the first exemplary embodiment up to step 130 (see FIG. 7). Thus, in the second exemplary embodiment, a "selected drawer" corresponds to a drawer selected in step 130. The similarity calculating unit 18 functions as a calculating unit that calculates the similarity between a document to be registered and a document stored in each folder extracted as a registration candidate and calculates the degree of recommendation of a folder based on the similarity.

The operation history information stored in the operation history information memory 26 includes at least an operation date and time, identification information of an operated document (document name), a storage destination for the document (folder name), an operator name (user name), and an operation name indicating the details of an operation. The related operation information memory 27, the operation ratio information memory 28, and the registration destination candidate folder memory 29 will be explained later along with explanation for processes.

A hardware configuration of the document management apparatus 10 according to the second exemplary embodiment may be the same as that in the first exemplary embodiment.

The storage place ACL receiving unit 11, the registration document information receiving unit 12, the display controller 13, the document management unit 14, the ACL change processing unit 15, the warning processing unit 16, the operation ratio information generating unit 17, and the similarity calculating unit 18 of the document management apparatus 10 are implemented by cooperative operation of a computer forming the document management apparatus 10 and a program running on the CPU 31 mounted on the computer. Furthermore, each of the document memory 21, the storage place ACL memory 22, the group information memory 23, the registration destination candidate drawer memory 24, the registration history information memory 25, the operation history information memory 26, the related operation information memory 27, the operation ratio information memory 28, and the registration destination candidate folder memory 29 is implemented by the HDD 34 mounted on the document management apparatus 10. Alternatively, the RAM 33 or an external memory may be used via a network.

Next, operation in the second exemplary embodiment will be explained. Setting of an ACL for a drawer is performed in advance by the storage place ACL receiving unit 11, as in the first exemplary embodiment.

The document registration process according to the second exemplary embodiment will now be explained. The document registration process according to the second exemplary embodiment is basically the same as that according to the first exemplary embodiment, which has been described above with reference to FIG. 7. In particular, the processing up to step 130 may be the same. The document registration process according to the second exemplary embodiment is different from that according to the first exemplary embodiment in that a display target and a document registration destination are a folder not a drawer in steps 140 and 150.

Figure 15:
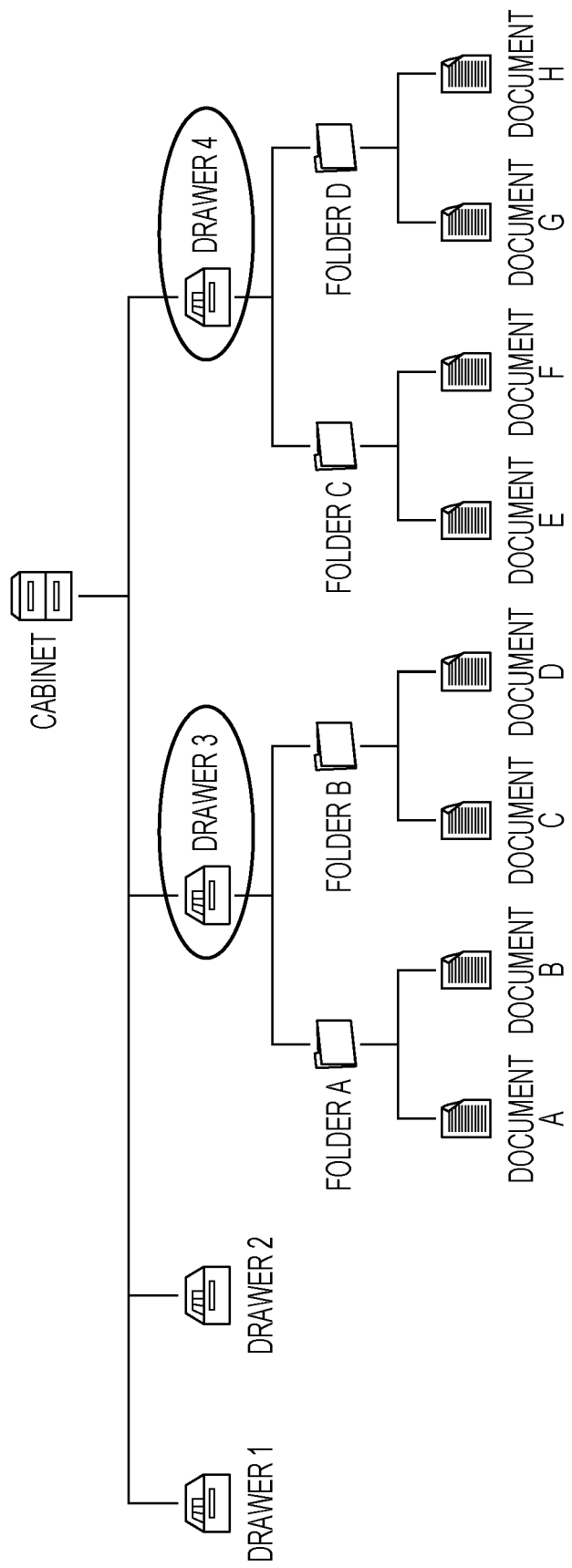
FIG. 15 is a conceptual diagram illustrating the relationship of storage places set in a document memory according to the second exemplary embodiment.

FIG. 15 is a conceptual diagram illustrating the relationship of storage places set in the document memory 21 in the second exemplary embodiment. The hierarchical structure of storage places is the same as that in the first exemplary embodiment illustrated in FIG. 3. In FIG. 15, folder names are clearly indicated. In addition, the state in which the drawers 3 and 4 are selected as registration destination candidates in step 130 of the document registration process according to the second exemplary embodiment is illustrated. In the first exemplary embodiment, after that, in step 140, the display order of the drawers selected as registration destination candidates is controlled and a list is displayed. However, the second exemplary embodiment is characterized in that a folder as a candidate for a registration destination for a document is selected from among folders A, B, C, and D in a layer below the drawers 3 and 4 and recommended.

The drawers 3 and 4 are selected in the processing up to step 130, and therefore, the operation ratio information generating unit 17 extracts operation history information regarding documents stored in the folders A to D in a layer below the selected drawers 3 and 4 from the operation history information. An extraction target period may be a desired period, such as a period from a recording start time for operation history information to the current time or the latest six months. FIG. 16 illustrates part of the extracted operation history information. In FIG. 16, folder names, operation names, and operator names, which are part of data items forming operation history information, are illustrated.

In the second exemplary embodiment, a folder as a registration destination candidate for a document is recommended, based on the frequency of use of a folder by a subject ("subject" in a query ACL, in this case, the users 1, 3, and 4). For this, the operation ratio information generating unit 17 selects an operation performed by a subject from extracted operation history information.

Furthermore, in the second exemplary embodiment, operation history information is narrowed down by extraction of an operation for which the details of operation (operation name) corresponds to a related operation. FIG. 17 illustrates a list of operations to be extracted (related operations) set in advance in the related operation information memory 27. As in the second exemplary embodiment, in the case where a folder as a registration destination candidate for a document is presented based on the frequency of use of the folder, it may be considered that obtaining the frequency of use by a subject only for "use" by interest or concern by the subject among accesses to the folder by the subject is preferable. Thus, in the second exemplary embodiment, to extract an operation which matches "use" based on interest or concern by a subject, related operations illustrated in FIG. 17 are set as operation extraction candidates.

That is, the operation ratio information generating unit 17 selects operation history information of an operation performed by a subject (users 1, 3, and 4) and corresponding to a related operation from operation history information for the folders A to D which may be set as registration destination candidates. In FIG. 16, a determination item is illustrated in association with operation history information. Operation history information in which a circle mark is indicated as a determination item is selected.

When operation history information of a corresponding operation by a subject is selected, then, the operation ratio information generating unit 17 generates operation ratio information. FIG. 18 illustrates a data configuration example of the generation operation ratio information. The operation ratio information includes a folder name, the total number of operations, the number of operations by a subject of a query ACL, and the ratio of operations by the subject of the query ACL. As the folder name, the name of a folder which may be set as a registration destination candidate for a document is set. As illustrated in FIG. 16, the total number of operations represents the total number of pieces of operation history information in which the corresponding folder is set as an operation destination among the extracted operation history information. The number of operations by a subject of a query ACL represents the number of pieces of operation history information in the case where a subject performs a related operation for the corresponding folder. This may also be a number obtained by counting the number of pieces of operation history information in which a circle mark is set as a determination item for each folder. For the folder A, the number of operations by each subject is illustrated. As a ratio, the ratio of the number of operations by a subject of a query ACL to the total number of operations is calculated and set for each folder. For calculation of a ratio, weighting may be performed according to the type of related operation. The operation ratio information generating unit 17 calculates the ratio and generates operation ratio information. Then, the generated operation ratio information is registered in the operation ratio information memory 28.

As is clear from the ratio illustrated in FIG. 18, the folder A has the highest ratio of operations by a subject of the query ACL (users 1, 3, and 4) of all the operators, and the folders B, C, and D are arranged in descending order. In terms of use ratio (ratio) of all the operators, it may be desirable that a registrar selects, as a registration destination for a document to be registered, in the order of the folder, A, B, C, and D.

As described above, the above-described ratio may be calculated as an index indicating the frequency of use by a subject of a query ACL, and display of a folder which may be set as a registration destination candidate for a document may be controlled based on the calculated ratio.

However, for example, in the case where documents are categorized into folders according to the type of document, a data format, or the like and managed, it may be considered that it is not desirable to register a document to be registered is registered in a folder with a low relevance to the document.

Thus, in the second exemplary embodiment, the similarity between a document to be registered and a document stored in each folder is further calculated, and a folder in which a document with a high similarity is stored may be recommended.

For this, the similarity calculating unit 18 first determines a folder for which similarity is to be calculated by referring to operation ratio information. The similarity calculating unit 18 may set all the folders included in operation ratio information as calculation targets. In this case, however, three folders with higher ratio, that is, the folders A, B, and C are selected as calculation targets for similarity. Folders may be selected according to selection conditions set in advance, such as upper n folders (n represents 1 to the number of folders included in operation history information) or a folder with a ratio of a predetermined threshold or more, may be selected.

As illustrated in FIG. 15, the documents A to F are stored in the selected folders A, B, and C. Therefore, the similarity calculating unit 18 calculates the similarity between a document to be registered and each of the documents A to F. The similarity may be calculated using an existing technique such as TF-IDF method. FIG. 19 illustrates a calculation result of the similarity with each of the documents A to F. In the second exemplary embodiment, the degree of recommendation of a folder is presented, and therefore, the similarity between a document to be registered and a folder is calculated based on the calculated degree of recommendation. As described later, a single similarity is calculated for each folder based on the similarity of one or more documents stored in each folder. Therefore, for the sake of convenience, the single similarity will be referred to as "similarity of a folder".

Figures 20, 21:
FIG. 20 is a diagram illustrating the similarity between a document to be registered and a folder as a candidate for a registration destination in the second exemplary embodiment.
FIG. 21 is a diagram illustrating a display example of a list screen of folders as candidates for a registration destination for a document in the second exemplary embodiment.

FIG. 20 illustrates the calculated similarity of folders. In the second exemplary embodiment, the similarity of a folder is obtained by calculating the average similarity between each document and a document to be registered for each folder. Obviously, the similarity of a folder is not necessarily calculated in the above method. For example, the maximum similarity of a document included in a corresponding folder may be adopted as the similarity of a folder. The similarity calculating unit 18 registers the similarity of a folder obtained as described above as similarity information in the registration destination candidate folder memory 29.

When the similarity of a folder is calculated, the display processing part 132 transmits a list of folders recommended as registration destination candidates to a user terminal, so that the list is displayed on the user terminal. FIG. 21 illustrates a display example of a folder list screen displayed on a user terminal. As in the first exemplary embodiment, folders may be displayed as a list in descending order of similarity of folders. In the second exemplary embodiment, however, the degree of recommendation is presented.

For this, the display processing part 132 refers to similarity information registered in the registration destination candidate folder memory 29, selects upper two folders, that is, the folders A and C, as candidates for registration destinations for a document, and presents the selected candidates to a registrar. Folders may be selected according to selection conditions set in advance, such as upper n folders (n represents 1 to the number of folders included in similarity information) or a folder with a similarity of a predetermined threshold or more, may be selected.

A folder list screen is displayed after a registrar presses the "search" button 84 on the upload screen illustrated in FIG. 8. The registrar selects a folder as a registration destination for a document with reference to the degree of recommendation from among folders displayed on the list screen.

In the first exemplary embodiment, drawers are arranged and displayed in descending order of priority. The degree of recommendation in the second exemplary embodiment is information corresponding to the arrangement order in the first exemplary embodiment. Therefore, rearrangement is not particularly needed. In the display example illustrated in FIG. 21, a folder with more starts may be defined as a folder with a higher degree of recommendation and a higher priority level.

In the second exemplary embodiment, the degree of recommendation is represented by the number of starts. However, this is merely an example. A method for presenting the degree of recommendation is not necessarily limited to this.

After that, processing is performed as in the first exemplary embodiment. That is, the document management unit 14 registers an acquired document to be registered in a folder selected by a registrar, and registers registration history information in the registration history information memory 25.

In the second exemplary embodiment, a storage place as a display control target, that is, display of a folder, may be controlled based on the frequency of use by a subject of a query ACL, specifically, the ratio of the number of operations by a subject of a query ACL to the total number of operations for each folder. Accordingly, folders with a high ratio of the number of operations by a subject of a query ACL may be displayed preferentially. In other words, a folder with a low ratio of the number of operations by users other than the subject of the query ACL may be displayed preferentially.

When a document is registered in a folder with an ACL for which many users other than the subject of the query ACL are set, the document may be used by the users other than the subject. However, a case where there is no user which matches the subject of the query ACL, such as the drawer 1 in the first exemplary embodiment (FIG. 9), and a case where a user other than the subject is set as the ACL for the folder, such as the drawer 2 (see FIG. 9), may be easily conceived. As described above, to select an appropriate folder from among folders for which a user other than a subject is set as the ACL, the frequency of use by a user is focused on in the second exemplary embodiment. That is, the above-described ratio is obtained for each folder, a folder with a higher frequency of use by a subject, in other words, a folder with a lower frequency of use by a user other than the subject, may be recommended. Accordingly, a folder with a lower frequency of use by a user other than the subject is easily selected, and therefore, an opportunity that the document is accessed by a user other than the subject may be reduced.

Furthermore, in the second exemplary embodiment, not only frequency of use but also the similarity between a document to be registered and a folder is obtained. Thus, convenience in terms of management of a document may also be achieved.

In the first exemplary embodiment, a drawer is presented as a registration destination candidate for a document. In the second exemplary embodiment, a folder is presented as a registration destination candidate for a document. These exemplary embodiments may be combined so that both a drawer and a folder may be presented as registration destination candidates.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A file management apparatus comprising:
   a receiving unit that receives a plurality of identification information of a plurality of users who are allowed to access a file; and
   a display controller that controls display of a storage place that the users corresponding to the plurality of identification information received by the receiving unit are able to access, among storage places for which access right is set;
   a storage place creating unit that creates, when a user corresponding to identification information received by the receiving unit is not allowed to access an existing storage place, a storage place for the file by creating a new storage place or changing a setting of access right for an existing storage place;
   a notifying unit that notifies, in a case where a storage place is to be deleted or a setting of access right for a storage place is to be changed, a user by which a file is registered in the storage place of the deletion of the storage place or the change of the setting of the access right for the storage place; and
   a file deleting unit that deletes, in a case where the user who receives the notification by the notifying unit indicating that the storage place is to be deleted rejects the deletion of the storage place, files other than the file registered in the storage place by the user who rejects the deletion.

2. The file management apparatus according to claim 1, wherein in a case where a plurality of storage places as display control targets exist, the display controller performs control such that a list of the plurality of storage places is displayed according to a predetermined prioritization condition.

3. The file management apparatus according to claim 2, wherein the display controller performs control such that a storage place with a less number of users for whom access right is set is displayed preferentially.

4. The file management apparatus according to claim 2, wherein the display controller performs control such that a storage place with narrower access right for a user corresponding to identification information not received by the receiving unit is displayed preferentially.

5. The file management apparatus according to claim 2, wherein the display controller controls display of a storage place as a display control target, based on a frequency of use of the storage place by a user corresponding to identification information received by the receiving unit.

6. The file management apparatus according to claim 5, wherein the display controller performs control such that a storage place with a higher frequency of use by a user corresponding to identification information received by the receiving unit is displayed preferentially.

7. The file management apparatus according to claim 5, wherein the display controller performs control such that a storage place with a lower frequency of use by a user corresponding to identification information not received by the receiving unit is displayed preferentially.

8. The file management apparatus according to claim 1, wherein the display controller performs control such that a storage place which is in a layer lower than a storage place as a display control target and for which same access right as that for the storage place as the display control target is set is also displayed.

9. The file management apparatus according to claim 8, further comprising:
   a calculating unit that calculates a degree of recommendation of the storage place in the lower layer,
   wherein the display controller controls display of the degree of recommendation of the storage place in the lower layer.

10. The file management apparatus according to claim 9, wherein the calculating unit calculates, as the degree of recommendation, a similarity between the file and a file stored in the storage place in the lower layer.

11. The file management apparatus according to claim 1, wherein in a case where the storage place creating unit performs processing for changing the setting of the access right for the existing storage place, the display controller performs control such that a storage place with a less number of changes in setting for access right is displayed preferentially.

12. The file management apparatus according to claim 1, further comprising:
   a moving unit that creates, in a case where the user who receives the notification by the notifying unit indicating that the setting of the access right for the storage place is to be changed rejects the change, a new storage place which takes over the setting of the access right for the storage place and moves the file registered in the storage place by the user who rejects the change to the created new storage place.

13. The file management apparatus according to claim 1,
wherein the receiving unit receives identification information of a user and access right of the user to the file, and
wherein the display controller controls display of a storage place that a user corresponding to identification information received by the receiving unit is able to access based on the access right of the user to the file.

14. The file management apparatus according to claim 1,
wherein the receiving unit receives identification information of a group which is allowed to access the file, and
wherein in a case where the identification information of the group is received by the receiving unit, the display controller controls display of a storage place that a user belonging to the group corresponding to the identification information is able to access.

15. A non-transitory computer readable medium storing a program causing a computer to execute a process for file management, the process comprising:
receiving a plurality of identification information of a plurality of users who are allowed to access a file; and
controlling display of a storage place that the users corresponding to the plurality of identification information received by the receiving unit are able to access, among storage places for which access right is set;
creating, when a user corresponding to the received identification information is not allowed to access an existing storage place, a storage place for the file by creating a new storage place or changing a setting of access right for an existing storage place;
notifying, in a case where a storage place is to be deleted or a setting of access right for a storage place is to be changed, a user by which a file is registered in the storage place of the deletion of the storage place or the change of the setting of the access right for the storage place; and
deleting, in a case where the user who receives the notification indicating that the storage place is to be deleted rejects the deletion of the storage place, files other than the file registered in the storage place by the user who rejects the deletion.

\* \* \* \* \*